(12) United States Patent
Yamanaka et al.

(10) Patent No.: US 12,199,251 B2
(45) Date of Patent: Jan. 14, 2025

(54) IMPACT DETECTION DEVICE AND POWER STORAGE PACK

(71) Applicant: Panasonic Intellectual Property Management Co., Ltd., Osaka (JP)

(72) Inventors: Koki Yamanaka, Osaka (JP); Yuta Kurosaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 482 days.

(21) Appl. No.: 17/672,623

(22) Filed: Feb. 15, 2022

(65) Prior Publication Data

US 2022/0173444 A1 Jun. 2, 2022

Related U.S. Application Data

(63) Continuation of application No. PCT/JP2020/034800, filed on Sep. 15, 2020.

(30) Foreign Application Priority Data

Sep. 27, 2019 (JP) ................................. 2019-177301

(51) Int. Cl.
*H01M 10/48* (2006.01)
*G01P 15/18* (2013.01)
(Continued)

(52) U.S. Cl.
CPC ............. *H01M 10/48* (2013.01); *G01P 15/18* (2013.01); *H01M 10/44* (2013.01); *H02J 7/0047* (2013.01); *H01M 2220/20* (2013.01)

(58) Field of Classification Search
CPC .. H01M 10/48; H01M 10/44; H01M 2220/20; H01M 10/42; H01M 10/0431;
(Continued)

(56) References Cited

U.S. PATENT DOCUMENTS 6,664,000 B1\* 12/2003 Sonobe ............... H01M 10/425
429/61
2006/0236761 A1\* 10/2006 Inoue ................... G01P 15/0891
(Continued)

FOREIGN PATENT DOCUMENTS

CN 109910679 A 6/2019
JP 2001-102092 4/2001
(Continued)

OTHER PUBLICATIONS

English Translation of Chinese Office Action dated Jan. 29, 2024 for the related Chinese Patent Application No. 202080058286.2.
(Continued)

*Primary Examiner* — Abdullah A Riyami
*Assistant Examiner* — Nader J Alhawamdeh
(74) *Attorney, Agent, or Firm* — Rimon P.C.

(57) ABSTRACT

In impact detection device to be mounted on power storage pack, an impact detection circuit compares detection values of three axes output from a three-axis accelerometer sensor with thresholds set to different values according to mechanical characteristics of power storage pack, and detects an impact outside an allowable range. For example, power storage pack includes wound cylindrical cells, and a threshold of an axis in a direction along a winding axis may be set to a value smaller in absolute value than thresholds of other two axes.

12 Claims, 5 Drawing Sheets

(51) Int. Cl.
  *H01M 10/44* (2006.01)
  *H02J 7/00* (2006.01)
(58) Field of Classification Search
  CPC .. H01M 50/242; G01P 15/18; G01P 15/0891; H02J 7/0047
  See application file for complete search history.

(56) References Cited

U.S. PATENT DOCUMENTS

| | | | |
|---|---|---|---|
| 2008/0168840 A1* | 7/2008 | Seeley | G01H 11/08 73/649 |
| 2010/0312435 A1 | 12/2010 | Mase et al. | |
| 2011/0109330 A1* | 5/2011 | Ikuta | G01L 9/12 455/127.5 |
| 2013/0078968 A1* | 3/2013 | Breed | G01S 13/878 455/414.1 |
| 2022/0021071 A1* | 1/2022 | Shimizu | B60Q 9/00 |
| 2022/0173444 A1* | 6/2022 | Yamanaka | G01P 15/18 |

FOREIGN PATENT DOCUMENTS

| | | | | |
|---|---|---|---|---|
| JP | 2001102092 A | * | 4/2001 | .......... H01M 10/425 |
| JP | 2008-020250 | | 1/2008 | |
| JP | 2011-099833 | | 5/2011 | |

OTHER PUBLICATIONS

International Search Report of PCT application No. PCT/JP2020/034800 dated Dec. 15, 2020.
English Translation of Chinese Office Action dated Jul. 3, 2024 for the related Chinese Patent Application No. 202080058286.2.

* cited by examiner

IMPACT DETECTION DEVICE AND POWER STORAGE PACK

TECHNICAL FIELD

The present invention relates to an impact detection device for detecting an impact on a power storage pack, and a power storage pack equipped with the impact detection device.

BACKGROUND ART

In recent years, electric motorcycles and electric bicycles have become widespread. Many of these vehicles use removable, portable battery packs. Portable battery packs are also used in low speed electric vehicles (e.g., commuter, golf cart). By exchanging and using a plurality of portable battery packs, it is possible to reduce a period during which the vehicles cannot run due to charging. However, since the portable battery pack can be carried by a user, the chance of receiving an impact due to dropping or the like increases as compared with a battery pack fixed in the vehicle. It is conceivable to use a three-axis accelerometer sensor to detect the impact on the battery pack (see, for example, PTL 1).

CITATION LIST

Patent Literature

PTL 1: Unexamined Japanese Patent Publication No. 2008-20250

SUMMARY OF THE INVENTION

The battery pack has a plurality of cells and modules, a bus bar for connecting the plurality of cells and modules, and a terminal portion for connecting to a main body. Due to the mechanical characteristics of these configuration members, an impact strength that guarantees safety differs between three axes (X-axis, Y-axis, and Z-axis).

The present disclosure has been made in view of these circumstances, and an object of the present disclosure is to provide a technique for detecting an impact outside an allowable range on a power storage pack with high accuracy.

In order to solve the above problem, an impact detection device of one aspect of the present disclosure is an impact detection device to be mounted on a power storage pack, which includes a three-axis accelerometer sensor, and an impact detection circuit that compares detection values of three axes output from the three-axis accelerometer sensor with thresholds set to different values according to mechanical characteristics of the power storage pack, and detects an impact outside an allowable range.

Note that an arbitrary combination of the above configuration elements and the expression of the present disclosure converted among methods, devices, systems, and the like are also valid as an aspect of the present invention.

According to the present disclosure, it is possible to detect an impact that is outside the allowable range for the power storage pack with high accuracy.

DESCRIPTION OF EMBODIMENT

Figure 1:
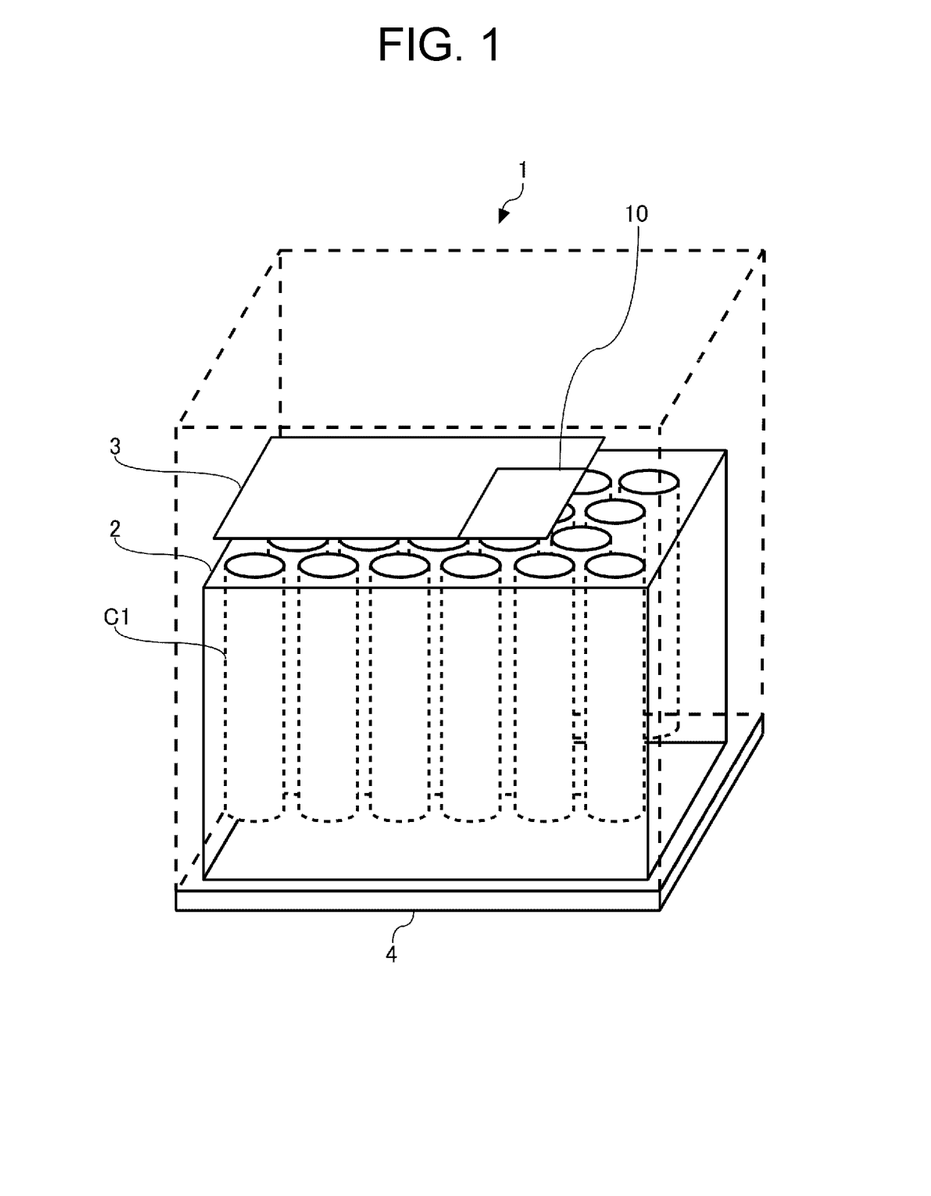
FIG. 1 is a perspective view schematically illustrating a schematic configuration of a battery pack according to an exemplary embodiment.

FIG. 1 is a perspective view schematically illustrating a schematic configuration of battery pack 1 according to an exemplary embodiment. Battery pack 1 includes battery module (assembled battery) 2 and control substrate 3. Battery module 2 includes a plurality of cells C1. For each of cells C1, a lithium-ion battery cell, a nickel hydrogen battery cell, a lead battery cell, or the like can be used. Hereinafter, an example using lithium-ion battery cells (nominal voltage: from 3.6 V to 3.7 V) is assumed in the present specification.

In an example illustrated in FIG. 1, the plurality of cylindrical cells C1 are connected in parallel to form battery module 2. In reality, parallel cells in which the plurality of cylindrical cells C1 are connected in parallel are connected in series to form battery module 2. The number of series connections of the parallel cells is determined by a voltage required by an application. Furthermore, the number of parallel connections in each parallel cell is determined according to a capacity required for an application.

Control substrate 3 is horizontally arranged on an upper part of battery module 2 in battery pack 1. The arrangement position and orientation of control substrate 3 are not limited to the example illustrated in FIG. 1, and the designer can arbitrarily design control substrate 3. A control device for managing a state of battery module 2 is mounted on control substrate 3. Further, in the present exemplary embodiment, impact detection device 10 for detecting an impact applied to battery pack 1 is mounted on control substrate 3.

Connecting portion 4 is installed on a bottom surface of battery pack 1. Connecting portion 4 includes a positive-electrode terminal connected to a positive electrode of battery module 2, a negative-electrode terminal connected to a negative electrode of battery module 2, and a control terminal connected to control substrate 3. Connecting portion 4 conducts with a connecting portion on a vehicle in a state where battery pack 1 is installed in a mounting slot on the vehicle.

Figure 2:
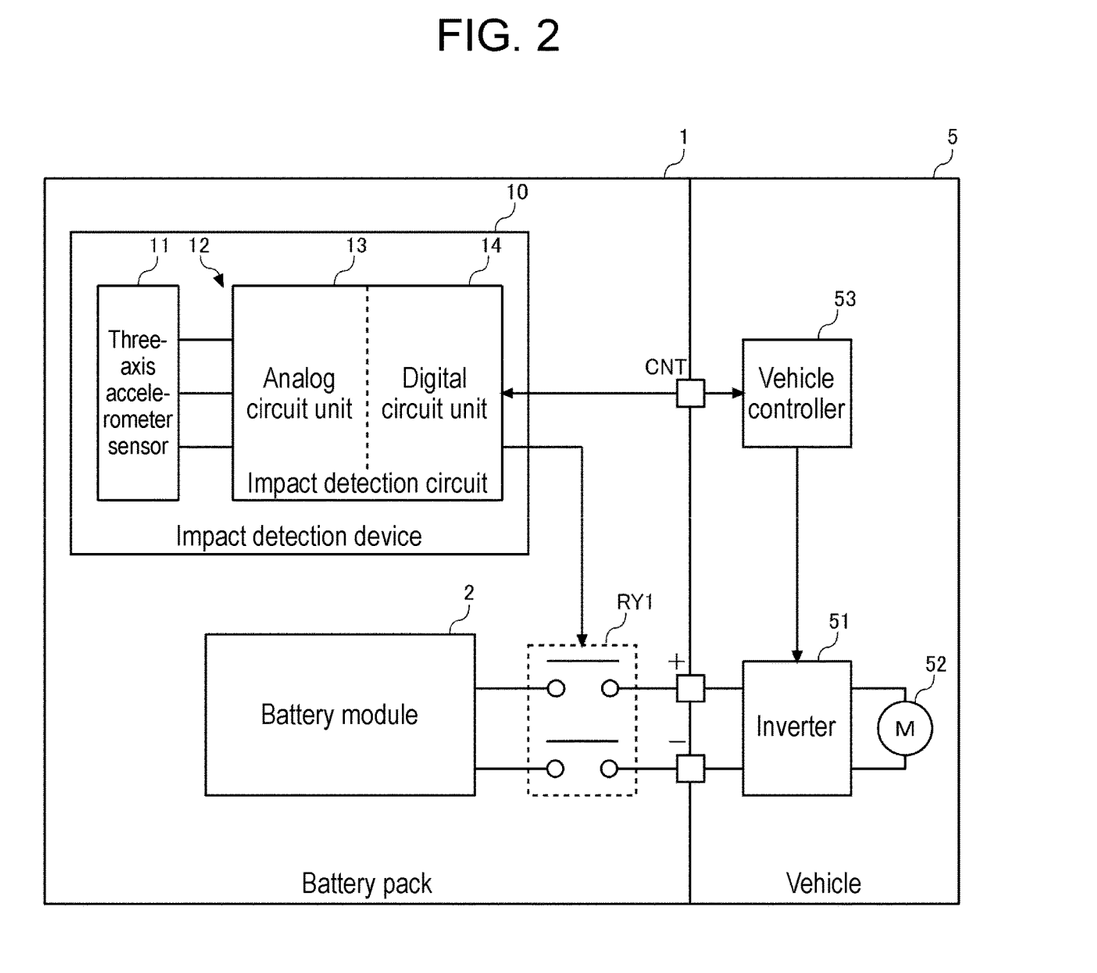
FIG. 2 is a diagram schematically illustrating configuration elements related to impact detection of a battery pack in a state where the battery pack according to the exemplary embodiment is mounted on a vehicle.

FIG. 2 is a diagram schematically illustrating configuration elements related to impact detection of battery pack 1 in a state where battery pack 1 according to the exemplary embodiment is mounted on vehicle 5. In battery pack 1, relay RY1 is provided on a current path connecting a positive-electrode terminal and a negative-electrode terminal of battery module 2, and positive-electrode terminal + and negative-electrode terminal − of connecting portion 4.

Vehicle 5 includes inverter 51, motor 52, and vehicle controller 53. Inverter 51 converts DC power supplied from battery pack 1 into AC power, and supplies it to motor 52 at the time of power running. At the time of regeneration, AC power supplied from motor 52 is converted into DC power to be supplied to battery pack 1. Motor 52 is a three-phase AC motor, and rotates in accordance with the AC power supplied from inverter 51 at the time of power running. At the time of regeneration, a rotational energy due to deceleration is converted into AC power to be supplied to inverter 51. Vehicle controller 53 is a vehicle electronic control unit (ECU) that controls entire vehicle 5. Vehicle controller 53 can receive an abnormality signal of battery module 2 from impact detection device 10 in battery pack 1.

Impact detection device 10 in battery pack 1 includes three-axis accelerometer sensor 11 and impact detection circuit 12. Impact detection circuit 12 includes analog circuit unit 13 and digital circuit unit 14.

Figure 3:
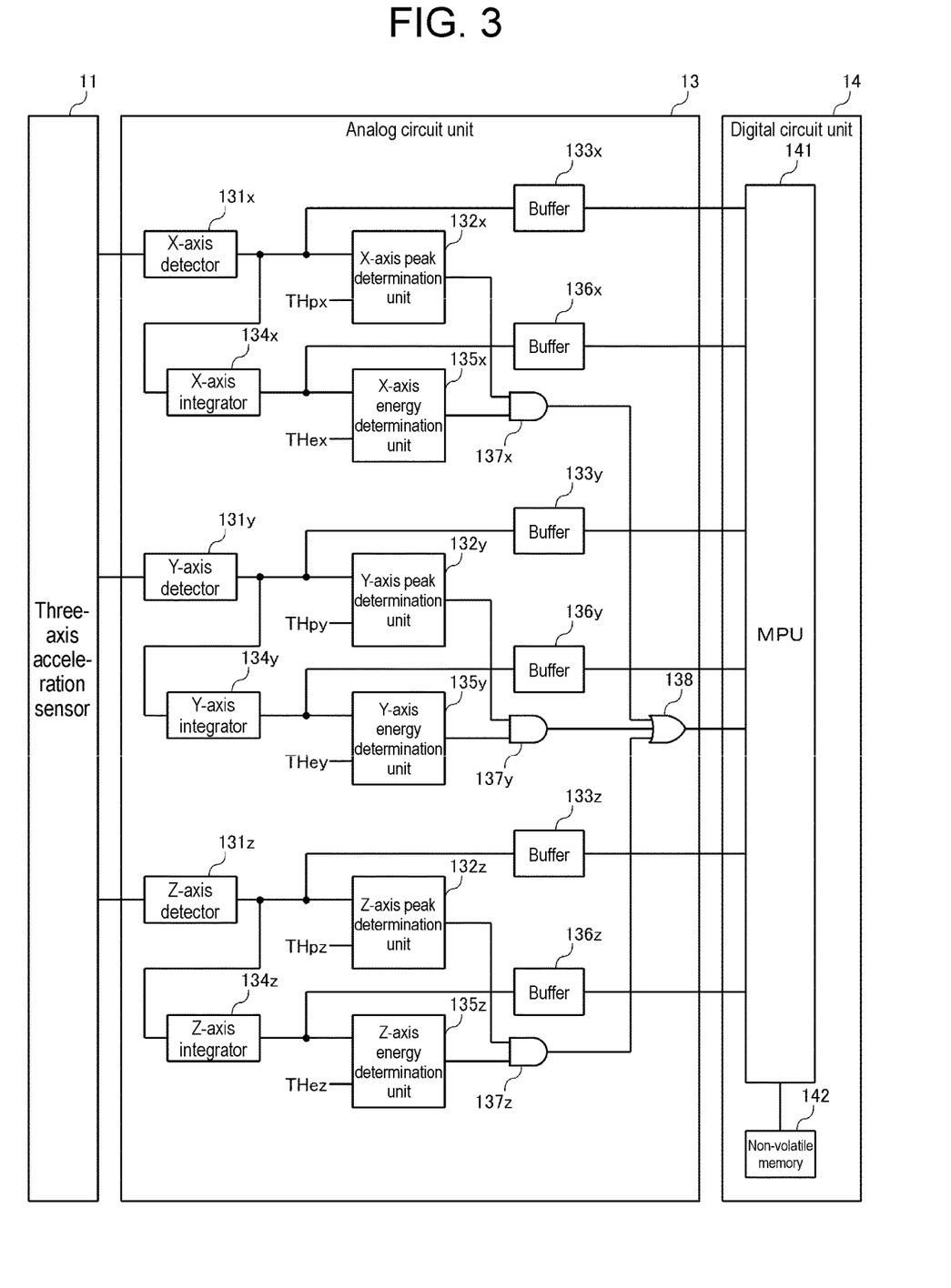
FIG. 3 is a diagram illustrating a configuration example of an impact detection device in the battery pack according to the exemplary embodiment.

FIG. 3 is a diagram illustrating a configuration example of impact detection device 10 in battery pack 1 according to the exemplary embodiment. Three-axis accelerometer sensor 11 detects acceleration applied to the sensor on three axes, and outputs electric signals corresponding to the detected acceleration on three channels. As three-axis accelerometer sensor 11, for example, a micro electro mechanical system (MEMS) type accelerometer sensor or a piezoelectric element type accelerometer sensor can be used. Depending on the form of an accelerometer sensor such as a piezoelectric element type, accelerometer sensors, each of which detects acceleration in each of the three axes, are combined and used as three-axis accelerometer sensor 11.

Analog circuit unit 13 of impact detection circuit 12 includes X-axis detector 131$x$, X-axis peak determination unit 132$x$, X-axis integrator 134$x$, X-axis energy determination unit 135$x$, Y-axis detector 131$y$, Y-axis peak determination unit 132$y$, Y-axis integrator 134$y$, Y-axis energy determination unit 135$y$, Z-axis detector 131$z$, Z-axis peak determination unit 132$z$, Z-axis integrator 134$z$, and Z-axis energy determination unit 135$z$ as main configuration elements.

Digital circuit unit 14 includes micro-processing unit (MPU) 141 and non-volatile memory 142. For example, an electrically erasable programmable read-only memory) (EE-PROM) or a flash memory can be used as non-volatile memory 142.

Hereinafter, as three-axis accelerometer sensor 11, an example of using a three-axis accelerometer sensor that changes by +0.05 V or by −0.05 V with respect to a change per 1 G in a positive or negative direction with a center value of 2.5 V for each of the X-axis, Y-axis, and Z-axis will be described. Note that a power source voltage of analog circuit unit 13 is 5 V.

X-axis detector 131$x$ acquires an output value of three-axis accelerometer sensor 11 and converts an acceleration component (±0.05 V/G) of the output value of three-axis accelerometer sensor 11 into an absolute value (2.5 V+|±0.05 V/G|), and outputs the absolute value. X-axis peak determination unit 132$x$ compares an output value of X-axis detector 131$x$ with X-axis peak threshold THpx, and when the output value of X-axis detector 131$x$ exceeds X-axis peak threshold THpx, a significant signal (high level signal) is output, and when it does not exceed, a non-significant signal (low level signal) is output. For example, if an unacceptable acceleration value is set to 7 G, peak threshold THpx is set to 2.85 V (=2.5+0.05×7). Buffer 133$x$ temporarily holds the output value of X-axis detector 131$x$.

The output value of X-axis detector 131$x$ is converted into a pulse signal, and output to X-axis integrator 134$x$. X-axis integrator 134$x$ integrates the output value of X-axis detector 131$x$ and integrates an energy value of battery pack 1 in an X-axis for a certain period of time. X-axis integrator 134$x$ integrates the energy value in the X-axis for a predetermined period of time when battery pack 1 receives an impact. Note that X-axis integrator 134$x$ has a discharge path for discharging a capacitor, and an output value of the X-axis integrator 134$x$ is reset at regular intervals. In addition, the output value of X-axis integrator 134$x$ is reset every time MPU 141 is activated and impact strength determination is executed with two reference values of a peak value and an energy amount of impact acceleration by MPU 141 described later.

X-axis energy determination unit 135$x$ compares the output value of X-axis integrator 134$x$ with X-axis energy threshold THex, and when the output value of X-axis integrator 134$x$ exceeds X-axis energy threshold THex, a significant signal (high level signal) is output, and when it does not exceed, a non-significant signal (low level signal) is output. For example, if an unacceptable impact energy value integrated on the X-axis in 1.0 second is set to 20 G, energy threshold THex is set to, for example, 3.5 V (=2.5+0.05×20). Buffer 136$x$ temporarily holds the output value of X-axis integrator 134$x$.

X-axis AND circuit 137$x$ outputs the logical product of an output of X-axis peak determination unit 132$x$ and an output of X-axis energy determination unit 135$x$. That is, X-axis AND circuit 137$x$ outputs a high level signal when the output value of X-axis detector 131$x$ exceeds X-axis peak threshold THpx and the output value of X-axis integrator 134$x$ exceeds X-axis energy threshold THex, and outputs a low level signal otherwise.

The same configuration elements as X-axis detector 131$x$, X-axis peak determination unit 132$x$, buffer 133$x$, X-axis integrator 134$x$, X-axis energy determination unit 135$x$, buffer 136$x$, and X-axis AND circuit 137$x$ described above are also provided on the Y-axis and the-Z axis, respectively.

X-axis peak threshold THpx, Y-axis peak threshold THpy, and Z-axis peak threshold THpz are set to different values according to the mechanical characteristics of battery pack 1. Furthermore, X-axis energy threshold THex, Y-axis energy threshold THey, and Z-axis energy threshold THez are also set to different values according to the mechanical characteristics of battery pack 1. For example, a drop test of battery pack 1 is performed in advance, and a peak threshold and an energy threshold for separating an impact within an allowable range and an impact outside the allowable range are derived in each of the three axis. The impact within the allowable range is an impact within the safety guarantee range of a battery manufacturer, and continued use of battery pack 1 is allowed. The impact outside the allowable range is an impact outside the safety guarantee range of the battery manufacturer, and continued use of battery pack 1 is prohibited. In this case, battery pack 1 needs to be discarded or repaired. Alternatively, the safety of battery pack 1 is verified, and the disposal, repair, or continuation of use of battery pack 1 is determined according to a result of this verification. X-axis peak threshold THpx, Y-axis peak threshold THpy and Z-axis peak threshold THpz, and X-axis energy threshold THex, Y-axis energy threshold THey and Z-axis energy threshold THez are set with a margin at a boundary of the safety guarantee range based on the impact within the allowable range, so that it is assumed that battery pack 1 can be used continuously even if it is judged that the impact is outside the allowable range. Note that, even when at least one threshold of X-axis peak threshold THpx, Y-axis peak threshold THpy, and Z-axis peak threshold THpz is set to a value different from the other thresholds, it corresponds to setting X-axis peak threshold THpx, Y-axis peak threshold THpy, and Z-axis peak threshold THpz to different values. Also, when at least one threshold of X-axis energy threshold THex, Y-axis energy threshold THey, and Z-axis energy threshold THez is set to a value different from the other thresholds, it corresponds to setting X-axis energy threshold THex, Y-axis energy threshold THey, and Z-axis energy threshold THez to different values.

Figure 4:
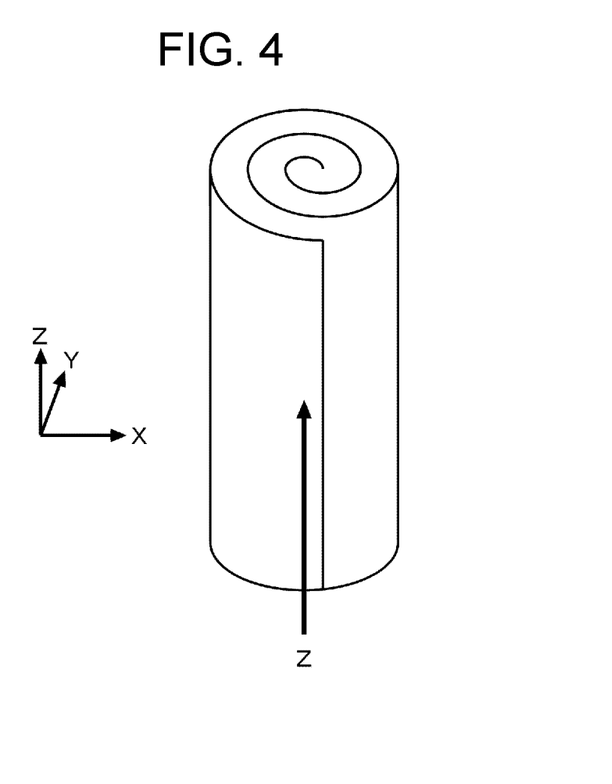
FIG. 4 is a diagram schematically illustrating a wound cylindrical cell.

FIG. 4 is a diagram schematically illustrating a wound cylindrical cell. The cylindrical cell is produced by stacking and winding sheet-shaped positive electrode material, negative electrode material, and separator that separates the positive and negative electrode materials. The cylindrical cell has a property that it is relatively vulnerable to an impact in a direction (direction along Z-axis in FIG. 4) along a winding axis and relatively strong against an impact in a direction (direction along X-axis and direction along Y-axis in FIG. 4) perpendicular to the winding axis. Therefore, in the wound cylindrical cell, Z-axis thresholds THpz and THez are set to values smaller in absolute value than X-axis thresholds THpx and THex and Y-axis thresholds THpy and THey. Note that the same consideration applies when a wound prismatic cell is used.

Figure 5:
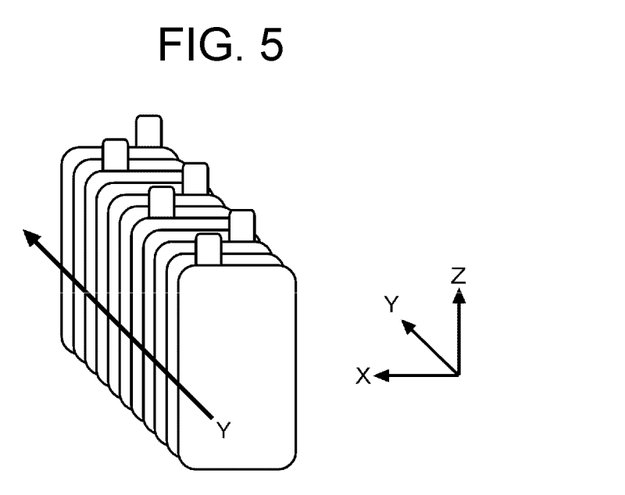
FIG. 5 is a diagram schematically illustrating a laminated cell.

FIG. 5 is a diagram schematically illustrating a laminated cell. The laminated cell is produced by laminating a sheet-shaped positive electrode material, separator, negative electrode material, and separator in order. The laminated cell has a property that it is relatively strong against an impact in a direction (direction along Y-axis in FIG. 5) along a lamination direction and relatively vulnerable to an impact in a direction (direction along X-axis and direction along Z-axis in FIG. 5) perpendicular to the lamination direction. Therefore, in the laminated cell, Y-axis thresholds THpy and THey are set to values larger in absolute value than X-axis thresholds THpx and THex and Z-axis thresholds THpz and THez. Note that the same consideration applies when a laminated prismatic cell is used.

The description returns to FIG. 3. OR circuit 138 outputs the logical sum of an output of X-axis AND circuit 137x, an output of Y-axis AND circuit 137y, and an output of Z-axis AND circuit 137z to a start terminal of MPU 141. When an impact exceeding the thresholds is detected on at least one of X-axis, Y-axis, and Z-axis, OR circuit 138 outputs a high level signal to the start terminal of MPU 141. OR circuit 138 outputs a low level signal to the start terminal of MPU 141 in a state where an impact exceeding the thresholds is not detected in all X-axis, Y-axis, and Z-axis.

Electric Power is supplied to analog circuit unit 13 and digital circuit unit 14 from battery module 2. Analog circuit unit 13 is always in operation. On the other hand, digital circuit unit 14 is normally stopped in order to suppress power consumption. MPU 141 is normally controlled to shut down, sleep or stand by. MPU 141 starts when a signal level of the start terminal changes from a low level to a high level. When MPU 141 is started, the output value of X-axis detector 131x, the output value of X-axis integrator 134x, the output value of Y-axis detector 131y, the output value of Y-axis integrator 134y, the output value of Z-axis detector 131z, and the output value of Z-axis integrator 134z held in buffers 133x, 136x, 133y, 136y, 133z, 136z, respectively, are captured internally.

Buffers 133x, 136x, 133y, 136y, 133z, 136z are responsible for holding the time from when an impact outside the allowable range is detected until MPU 141 is started, and the output value of X-axis detector 131x, the output value of X-axis integrator 134x, the output value of Y-axis detector 131y, the output value of Y-axis integrator 134y, the output value of Z-axis detector 131z, and the output value of Z-axis integrator 134z at the time of impact detection. The output value of X-axis detector 131x at the time of impact detection shows a peak value of the impact acceleration along the X-axis, and the output value of X-axis integrator 134x at the time of impact detection shows an energy amount of the impact acceleration along the X-axis. The same applies to the Y-axis and the Z-axis.

MPU 141 records the captured output value of X-axis detector 131x, output value of X-axis integrator 134x, output value of Y-axis detector 131y, output value of Y-axis integrator 134y, output value of Z-axis detector 131z, output value of Z-axis integrator 134z in non-volatile memory 142. The data recorded in non-volatile memory 142 will be used for impact analysis at a later date.

In addition, MPU 141 opens (offs) relay RY1 when the signal level of the start terminal changes from a low level to a high level, and prohibits charging and discharging of battery module 2. Further, when battery pack 1 is mounted on vehicle 5, MPU 141 transmits an abnormality signal of battery module 2 to vehicle controller 53.

The impact detection processing by impact detection device 10 described above is executed in a state where battery pack 1 is not mounted on vehicle 5. When battery pack 1 is mounted on vehicle 5, the impact detection processing by impact detection device 10 may be stopped. For example, if vehicle 5 is provided with an impact detection function for vehicle 5, it is less necessary to separately execute the impact detection processing in battery pack 1. Note that, if vehicle 5 does not have an impact detection function for vehicle 5, the above-mentioned impact detection processing is executed in battery pack 1.

As described above, according to the present exemplary embodiment, it is possible to, with low power consumption, detect an impact outside the allowable range for battery pack 1 with high accuracy. In the present exemplary embodiment, three-axis accelerometer sensor 11 is used, and the threshold of each axis is set to a different value according to the mechanical characteristics. When acceleration is detected by three-axis accelerometer sensor 11, an impact strength is determined based on the two reference values of the peak value of the impact acceleration and the time period (energy amount) during which the impact acceleration is applied. When impact acceleration exceeding the threshold is detected on at least one axis, MPU 141 is activated. MPU 141 stores the peak value and the amount of energy of the impact acceleration in non-volatile memory 142 for each axis. MPU 141 also performs safety control such as relay cuts.

When the impact acceleration exceeding the thresholds is not detected, MPU 141 is controlled to a shutdown state, a sleep state or a standby state, so that the power consumption of MPU 141 can be suppressed. When the impact acceleration exceeding the thresholds is detected, the above-mentioned safety control is executed, so that it is possible to prevent battery pack 1 from being used in an unsafe state. In the case of battery pack 1, even if it seems that there is no abnormality in appearance, there may be an abnormality in internal battery module 2.

Since the impact strength is determined based on the two reference values of the peak value and the amount of energy of the impact acceleration, it is possible to activate MPU 141 by an impact within the allowable range and prevent unnecessary safety control from being activated. Furthermore, since the determination is made on the three axes, the mechanical characteristics of battery pack 1 can be considered in detail, and whether or not an impact is within the allowable range can be determined with high accuracy. In addition, since the determination is made on the three axes, it is possible to prevent MPU 141 from being unnecessarily started due to acceleration generated by the transportation of battery pack 1 or an impact within the allowable range.

Figure 6:
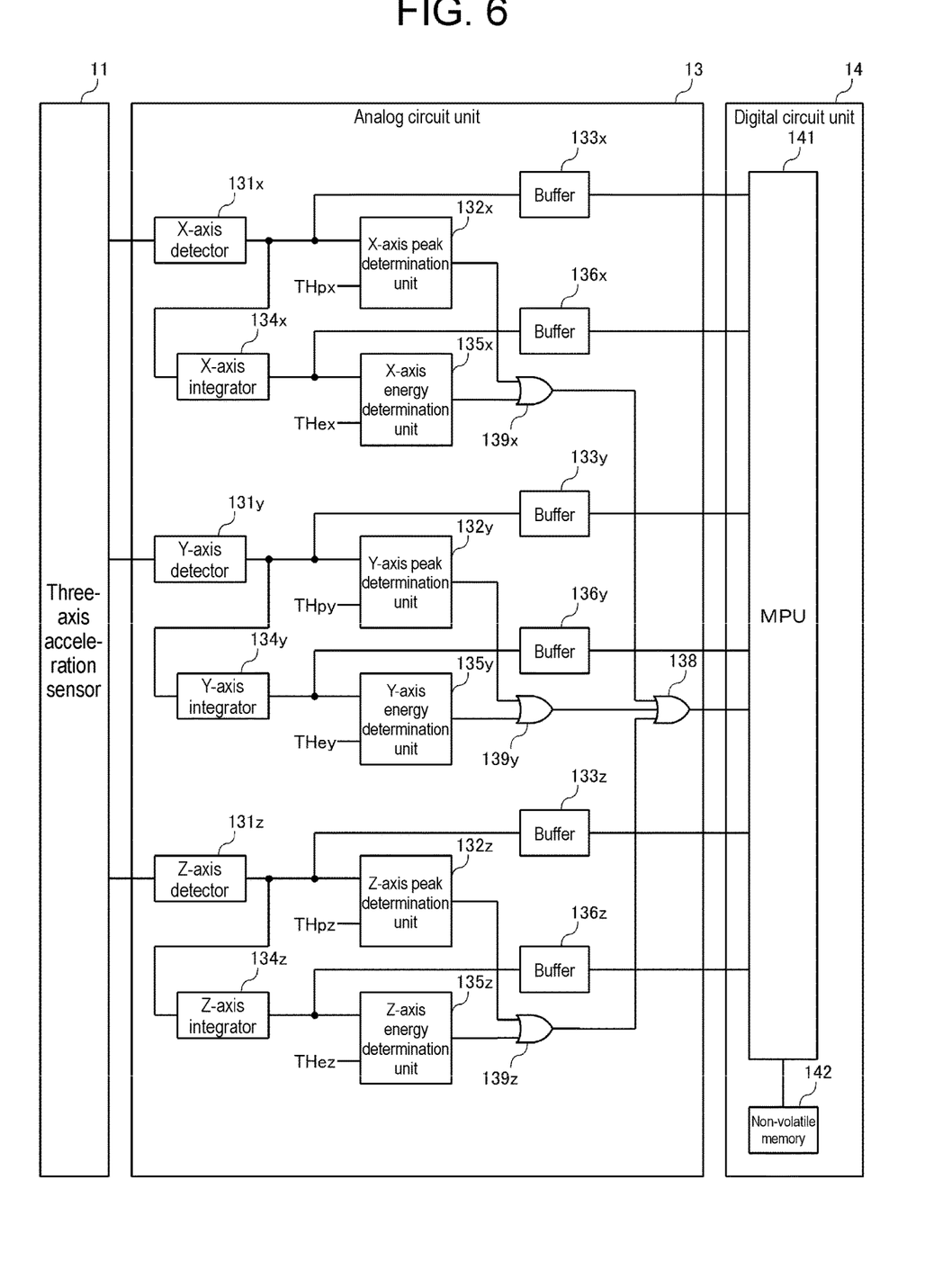
FIG. 6 is a diagram illustrating a configuration example of an impact detection device in a battery pack according to an exemplary embodiment different from the impact detection device in the battery pack illustrated in FIG. 3.

FIG. 6 is a diagram illustrating a configuration example of an impact detection device in a battery pack according to an exemplary embodiment different from the impact detection device in the battery pack illustrated in FIG. 3. An impact detection device illustrated in FIG. 6 includes X-axis OR circuit 139x that outputs the logical sum of the output of X-axis peak determination unit 132x and the output of X-axis energy determination unit 135x instead of X-axis AND circuit 137x, Y-axis OR circuit 139y that outputs the logical sum of the output of Y-axis peak determination unit 132y and the output of Y-axis energy determination unit 135y instead of Y-axis AND circuit 137y, and Z-axis OR circuit 139z that outputs the logical sum of the output of Z-axis peak determination unit 132z and the output of Z-axis energy determination unit 135z instead of Z-axis AND circuit 137z. Note that, in FIG. 6, the same configuration elements as those illustrated in FIG. 3 are given the same reference marks.

X-axis OR circuit 139x outputs the logical sum of the output of X-axis peak determination unit 132x and the output of X-axis energy determination unit 135x. That is, X-axis OR circuit 139x outputs a high level signal when the output value of X-axis detector 131x exceeds X-axis peak threshold THpx or the output value of X-axis integrator 134x exceeds X-axis energy threshold THex, and outputs low level signal otherwise.

Similarly, Y-axis OR circuit 139y outputs a high level signal when the output value of Y-axis detector 131y exceeds Y-axis peak threshold THpy or the output value of Y-axis integrator 134y exceeds Y-axis energy threshold THey, and outputs a low level signal otherwise. Z-axis OR circuit 139z outputs a high level signal when the output value of Z-axis detector 131z exceeds Z-axis peak threshold THpz or the output value of Z-axis integrator 134z exceeds Z-axis energy threshold THez, and outputs a low level signal otherwise.

OR circuit 138 outputs the logical sum of an output of X-axis OR circuit 139x, an output of Y-axis OR circuit 139y, and an output of Z-axis OR circuit 139z to the start terminal of MPU 141. Therefore, OR circuit 138 outputs a high level signal to the start terminal of MPU 141 when impact acceleration exceeding at least one of X-axis peak threshold THpx, Y-axis peak threshold THpy and Z-axis peak threshold THpz, and X-axis energy threshold THex, Y-axis energy threshold THey and Z-axis energy threshold THez is detected. Therefore, MPU 141 was started, and using the peak values of the impact acceleration of each axis of X, Y, Z based on each output value held in each buffer 133x, 133y, 133z, and the energy amount of the impact acceleration of each axis of X, Y, Z based on each output value held in each buffer 136x, 136y, 136z, MPU 141 determines whether the impact is within the allowable range or outside the allowable range for continued use of battery pack 1.

The present disclosure is described above according to the exemplary embodiments. It is understood by a person of ordinary skill in the art that the exemplary embodiments are merely an example, other modified examples in which configuration elements and processing processes of the exemplary embodiments are variously combined are possible, and the other modifications still fall within the scope of the present disclosure.

In the above-described exemplary embodiments, an example in which a lithium-ion battery is used for cell C1 is assumed, but a capacitor such as an electric double layer capacitor can also be used. Similar to batteries, capacitors are also available in cylindrical, square, and laminated types, each with different mechanical characteristics.

Further, in the above-described exemplary embodiments, an example of performing a drop impact determination based on the two reference values of the peak value and the energy amount of the impact acceleration has been described. In this regard, the drop impact determination may be performed only by the peak value of the impact acceleration. In this case, integrators 134, energy determination units 135, buffers 136, and AND circuits 137 illustrated in FIG. 3 become unnecessary. According to this, the cost of impact detection circuit 12 can be reduced.

Further, in the above-described exemplary embodiments, it is determined whether or not the impact is outside the allowable range by the AND condition of the comparison result between the two detection values of the peak value and the amount of energy of the impact acceleration, and the two thresholds. In this regard, it may be determined whether or not the impact is outside the allowable range based on an OR condition of the two comparison results. In this case, the design emphasizes safety.

Further, in the above-described exemplary embodiments, battery pack 1 to be mounted on vehicle 5 has been described. In this respect, battery pack 1 may be battery pack 1 to be mounted on an electronic device. For example, battery pack 1 to be mounted on a notebook PC may be used. In a state of being mounted on the notebook PC, the impact detection processing by impact detection device 10 in battery pack 1 is stopped, and the impact detection processing is executed in a state of being separated from the notebook PC.

Note that the exemplary embodiments may be specified by the following items.

Item 1

Impact detection device (10) to be mounted on power storage pack (1), device (10) including:

three-axis accelerometer sensor (11); and impact detection circuit (12) that compares detection values of three axes output from three-axis accelerometer sensor (11) with thresholds set to different values according to mechanical characteristics of power storage pack (1), and detects an impact outside an allowable range.

According to this, the impact outside the allowable range for power storage pack (1) can be detected with high accuracy.

Item 2

Impact detection device (10) according to the item 1, wherein power storage pack (1) includes wound cylindrical cells (C1) or prismatic cells (C1), and a threshold of an axis in a direction along a winding axis is set to a value smaller in absolute value than thresholds of other two axes.

According to this, it is possible to detect the impact outside the allowable range for power storage pack (1) using wound cylindrical cells (C1) or prismatic cells (C1) with high accuracy.

Item 3

Impact detection device (10) according to the item 1, wherein
power storage pack (1) includes laminated prismatic cells (C1) or laminated cells (C1), and
a threshold of an axis in a direction along a lamination direction is set to a value larger in absolute value than thresholds of other two axes.

According to this, it is possible to detect the impact outside the allowable range for power storage pack (1) using laminated prismatic cells (C1) or laminated cells (C1) with high accuracy.

Item 4

Impact detection device (10) according to any one of the items 1 to 3, wherein
impact detection circuit (12) includes:
analog circuit unit (13) that is always in operation; and
digital circuit unit (14) that is normally stopped, and
analog circuit unit (13) activates processor (141) in digital circuit unit (14) when axes of which detection values exceed the thresholds are detected.

According to this, it is possible to, with low power consumption, detect the impact outside the allowable range for power storage pack (1) with high accuracy.

Item 5

Impact detection device (10) according to any one of the items 1 to 3, wherein
impact detection circuit (12) includes:
first determination units (132x, 132y, 132z) that determine whether or not the detection values of the three axes exceed peak thresholds of the three axes, respectively;
three integrators (134x, 134y, 134z) into which the detection values of the three axes are input, respectively; and
second determination units (135x, 135y, 135z) that determine whether or not output values of three integrators (134x, 134y, 134z) exceed energy thresholds of the three axes, respectively, and
when axes occur on which the detection values exceed the peak thresholds and the output values of the integrators exceed the energy thresholds, it is determined that the impact outside the allowable range has been applied.

According to this, it is possible to detect the impact outside the allowable range for power storage pack (1) with high accuracy by using the peak values and the amounts of energy.

Item 6

Impact detection device (10) according to the item 5, wherein
impact detection circuit (12) includes:
analog circuit unit (13) that is always in operation; and
digital circuit unit (14) that is normally stopped,
analog circuit unit (13) includes:
first determination units (132x, 132y, 132z);
integrators (134x, 134y, 134z); and
second determination units (135x, 135y, 135z), and
when axes occur on which the detection values exceed the peak thresholds and the output values of the integrators exceed the energy thresholds, first determination units (132x, 132y, 132z) and second determination units (135x, 135y, 135z) activate processor (141) in digital circuit unit (14).

According to this, it is possible to, with low power consumption, detect the impact outside the allowable range for power storage pack (1) with high accuracy.

Item 7

Impact detection device (10) according to any one of the items 1 to 4, wherein
impact detection circuit (12) includes three integrators (134x, 134y, 134z) that integrate the detection values of the three axes for a certain period of time, respectively, and it is determined that the impact outside the allowable range has been applied based on the detection values of the three axes and the output values of the integrators.

According to this, it is possible to detect the impact outside the allowable range for power storage pack (1) with high accuracy by using the peak values and the amounts of energy.

Item 8

Impact detection device (10) according to the item 7, wherein
impact detection circuit (12) includes:
analog circuit unit (13) that is always in operation; and
digital circuit unit (14) that is normally stopped,
analog circuit unit (13) includes:
first determination units (132x, 132y, 132z) that determine whether or not the detection values of the three axes exceed peak thresholds of the three axes, respectively; and
second determination units (135x, 135y, 135z) that determine whether or not the output values of the three integrators (134x, 134y, 134z) exceed energy thresholds of the three axes, respectively, and
when at least one of the detection values exceeding the peak thresholds and the output values of the integrators exceeding the energy thresholds is detected, first determination units (132x, 132y, 132z) and second determination units (135x, 135y, 135z) activate processor (141) in digital circuit unit (14).

According to this, it is possible to, with low power consumption, detect the impact outside the allowable range for power storage pack (1) with high accuracy.

Item 9

Impact detection device (10) according to any one of the items 4, 6 and 8, wherein processor (141) prohibits charging and discharging of a plurality of cells (C1) when it is detected that the impact outside the allowable range has been applied.

According to this, the safety of power storage pack (1) can be ensured.

Item 10

Impact detection device (10) according to any one of the items 1 to 9, wherein impact detection device (10) stops impact detection processing when power storage pack (1) is mounted on power supply target device (5).

According to this, it is possible to, with low power consumption, detect the impact outside the allowable range for power storage pack (1) with high accuracy.

Item 11

Power storage pack (1) including:
a plurality of cells (C1); and
impact detection device (10) according to any one of the items 1 to 10.

According to this, it is possible to realize power storage pack (1) capable of detecting the impact outside the allowable range for power storage pack (1) with high accuracy.

REFERENCE MARKS IN THE DRAWINGS

1 battery pack
2 battery module
C1 cell
3 control substrate
4 connecting portion
10 impact detection device
5 vehicle
51 inverter
52 motor
53 vehicle controller
RY1 relay
11 three-axis accelerometer sensor
12 impact detection circuit
13 analog circuit unit
131$x$ X-axis detector
132$x$ X-axis peak determination unit
133$x$ buffer
134$x$ X-axis integrator
135$x$ X-axis energy determination unit
136$x$ buffer
137$x$ X-axis AND circuit
139$x$ X-axis OR circuit
131$y$ Y-axis detector
132$y$ Y-axis peak determination unit
133$y$ buffer
134$y$ Y-axis integrator
135$y$ Y-axis energy determination unit
136$y$ buffer
137$y$ Y-axis AND circuit
139$y$ Y-axis OR circuit
131$z$ Z-axis detector
132$z$ Z-axis peak determination unit
133$z$ buffer
134$z$ Z-axis integrator
135$z$ Z-axis energy determination unit
136$z$ buffer
137$z$ Z-axis AND circuit
139$z$ Z-axis OR circuit
138 OR circuit
14 digital circuit unit
141 MPU
142 non-volatile memory

The invention claimed is:

1. An impact detection device to be mounted on a power storage pack, the device comprising:
a three-axis accelerometer sensor; and
an impact detection circuit that compares three detection values with three thresholds respectively, the three detection values corresponding to each of three axes perpendicular to each other and being output from the three-axis accelerometer sensor, the three thresholds corresponding to the three detection values and being set to different values according to mechanical characteristics of the power storage pack, and detects an impact outside an allowable range in accordance with a result of the comparing.

2. The impact detection device according to claim 1, wherein
the power storage pack includes a wound cylindrical cell or a wound prismatic cell, stacking sheet-shaped positive electrode material, negative electrode material, and separator that separates the positive and negative electrode materials and winding around a winding axis,
the winding axis is parallel with one of the three axes, and
one of the three thresholds corresponding to the winding axis is set to a value smaller in absolute value than the others of the three thresholds.

3. The impact detection device according to claim 1, wherein
the power storage pack includes a laminated prismatic cell or a laminated cell, laminating a sheet-shaped positive electrode material, separator, negative electrode material, and separator in a lamination direction,
one of the three axes is in the lamination direction, and
one of the three thresholds corresponding to an axis in the lamination direction is set to a value larger in absolute value than the others of the three thresholds.

4. The impact detection device according to claim 1, wherein
the impact detection circuit includes:
an analog circuit unit that is always in operation; and
a digital circuit unit that is normally stopped, and
the analog circuit unit activates a processor in the digital circuit unit when the analog circuit unit detects at least one of the three detection values exceed corresponding threshold among the three thresholds.

5. The impact detection device according to claim 1, wherein
the impact detection circuit includes:
first determination units,
three integrators, and
second determination units,
the impact detection circuit being set three peak thresholds and three energy thresholds corresponding to the three thresholds, respectively,
the first determination units determining whether or not the three detection values exceed the three peak thresholds, respectively;
three integrators receiving the three detection values, respectively; and
second determination units determining whether or not three output values of the three integrators exceed the three energy thresholds, respectively, and
determining the impact outside the allowable range has been applied when at least one of the three detection values exceed at least one corresponding to the peak thresholds and at least one of the three output values of the integrators exceed at least one corresponding to the three energy thresholds.

6. The impact detection device according to claim 5, wherein
the impact detection circuit includes:
an analog circuit unit that is always in operation; and
a digital circuit unit that is normally stopped, the analog circuit unit includes:
   the first determination units;
   the integrators; and
   the second determination units, and
the first determination units and the second determination units activate a processor in the digital circuit unit, when the first determination units and the second determination units detect at least one of the three detection values exceed corresponding peak threshold to the three peak thresholds and at least one of the three output values of the integrators exceed corresponding energy threshold to the three energy thresholds.

7. The impact detection device according to claim 1, wherein
   the impact detection circuit includes three integrators that integrate the three detection values individually for a constant period of time, and
   determining the impact outside the allowable range has been applied based on the three detection values and the output values of the three integrators.

8. The impact detection device according to claim 7, wherein
   the impact detection circuit includes:
      an analog circuit unit that is always in operation; and
      a digital circuit unit that is normally stopped,
   the analog circuit unit includes:
      first determination units; and
      second determination units,
         the analog circuit being set three peak thresholds and three energy thresholds corresponding to the three thresholds, respectively,
         the first determination units determining whether or not the three detection values exceed the three peak thresholds, respectively; and
         the second determination units determining whether or not the output values of the three integrators exceed the three energy thresholds, respectively, and
   the first determination units and the second determination units activate a processor in the digital circuit unit when at least one of detecting that at least one of the three detection values exceeds corresponding peak threshold of the peak thresholds and detecting at least one of the three output values of the integrators exceeds corresponding energy threshold of the three energy thresholds.

9. The impact detection device according to claim 4, wherein the processor prohibits charging and discharging of a plurality of the cells when analog circuit unit detects that the impact outside the allowable range has been applied.

10. The impact detection device according to claim 1, wherein the impact detection device stops impact detection processing when the power storage pack is mounted on a power supply target device.

11. A power storage pack comprising:
   a plurality of cells; and
   the impact detection device according to claim 1.

12. The impact detection device according to claim 4, wherein the analog circuit unit is set the three thresholds.

* * * * *